May 21, 1963
J. R. GREENO ET AL
3,090,407
HELICAL WIRE TRIMMING AND FORMING MECHANISM
Filed March 14, 1960
5 Sheets-Sheet 4
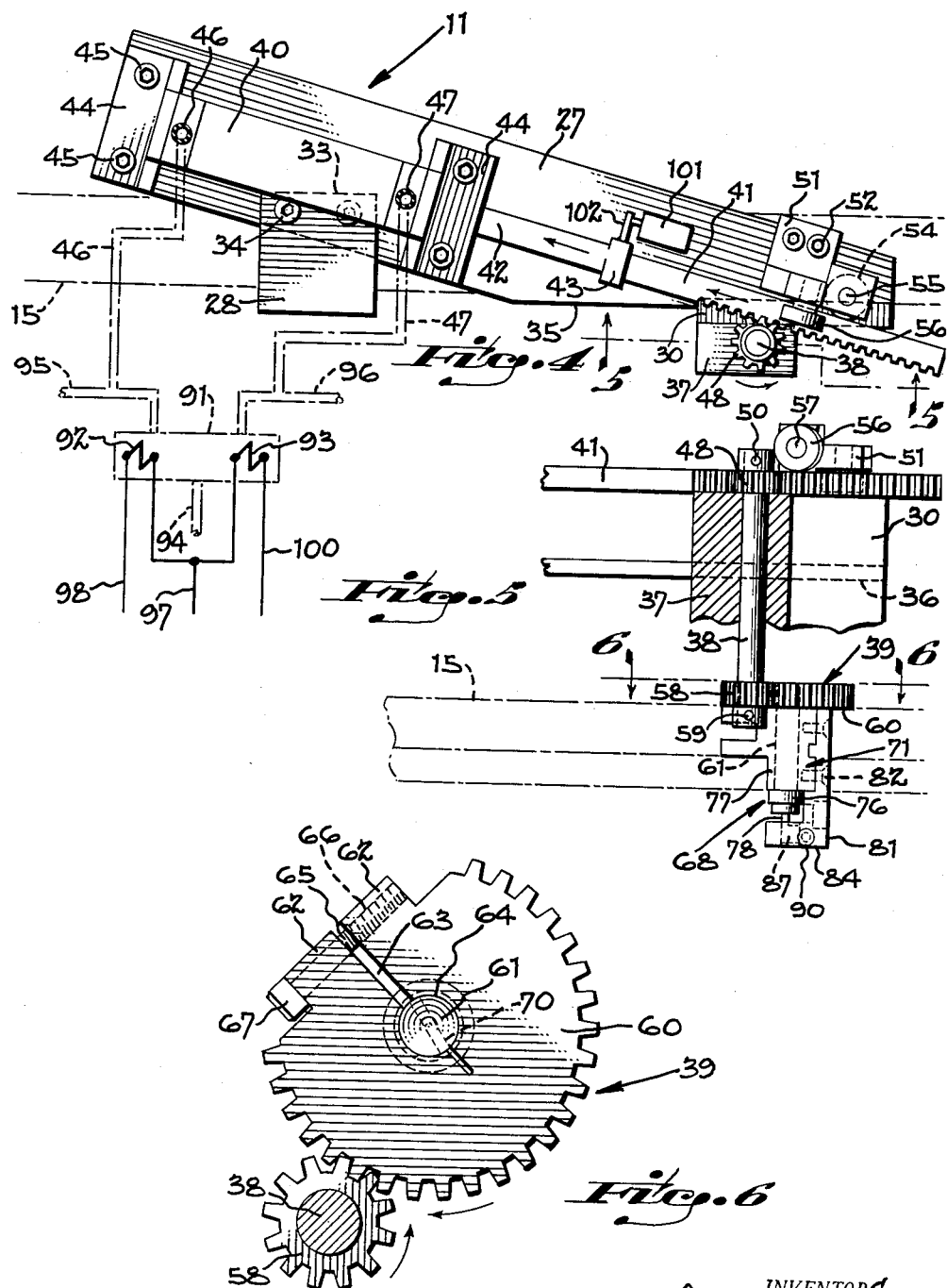

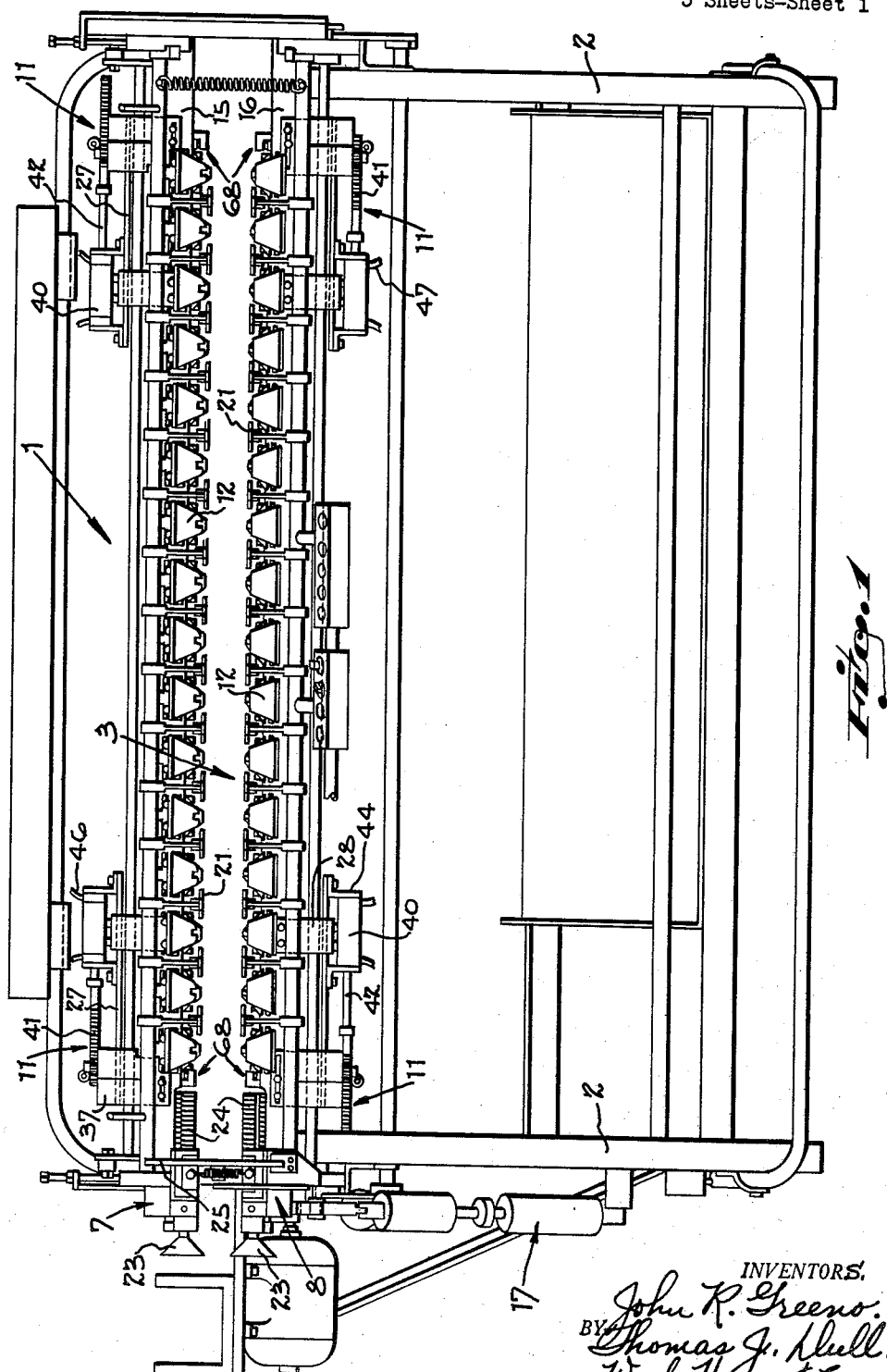

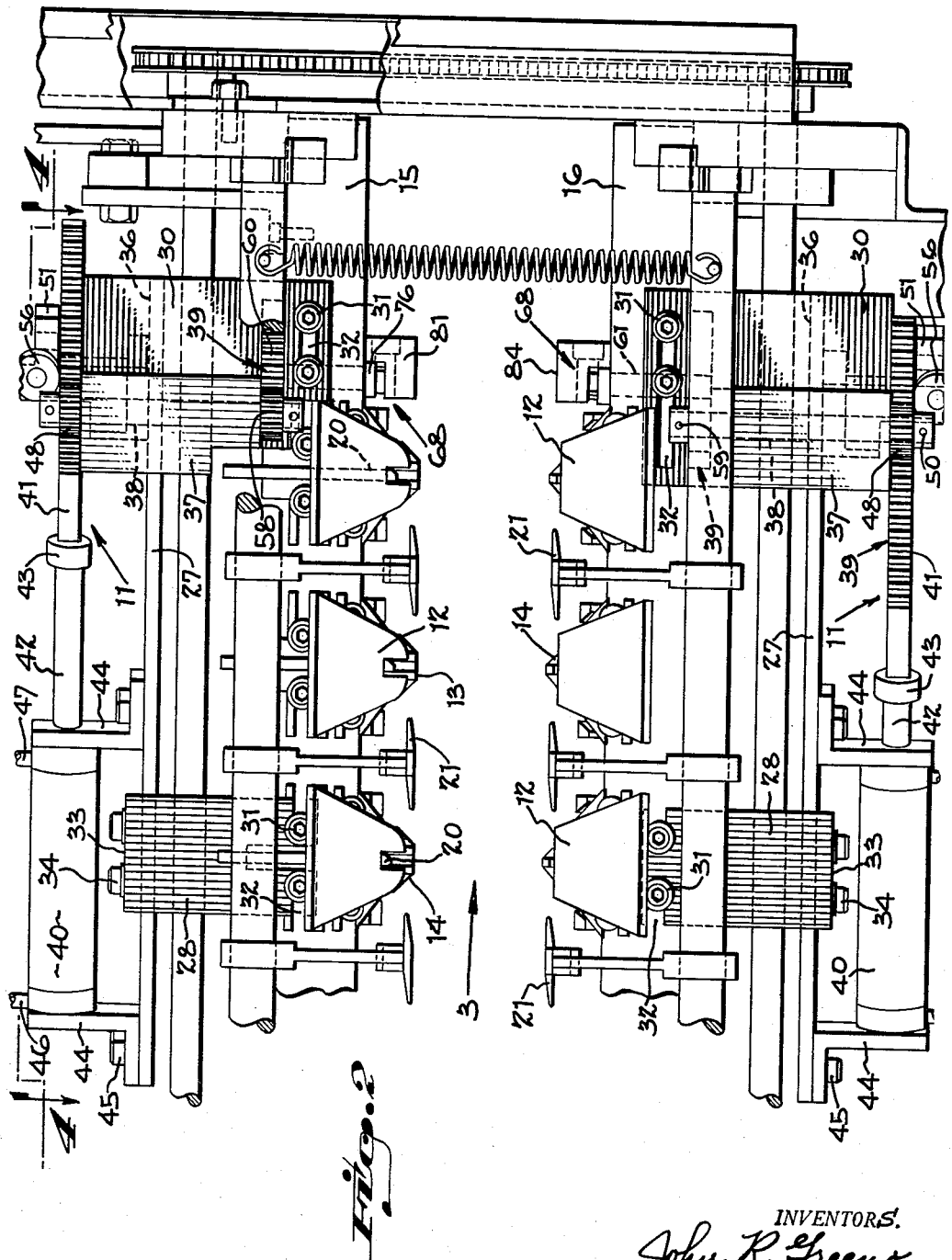

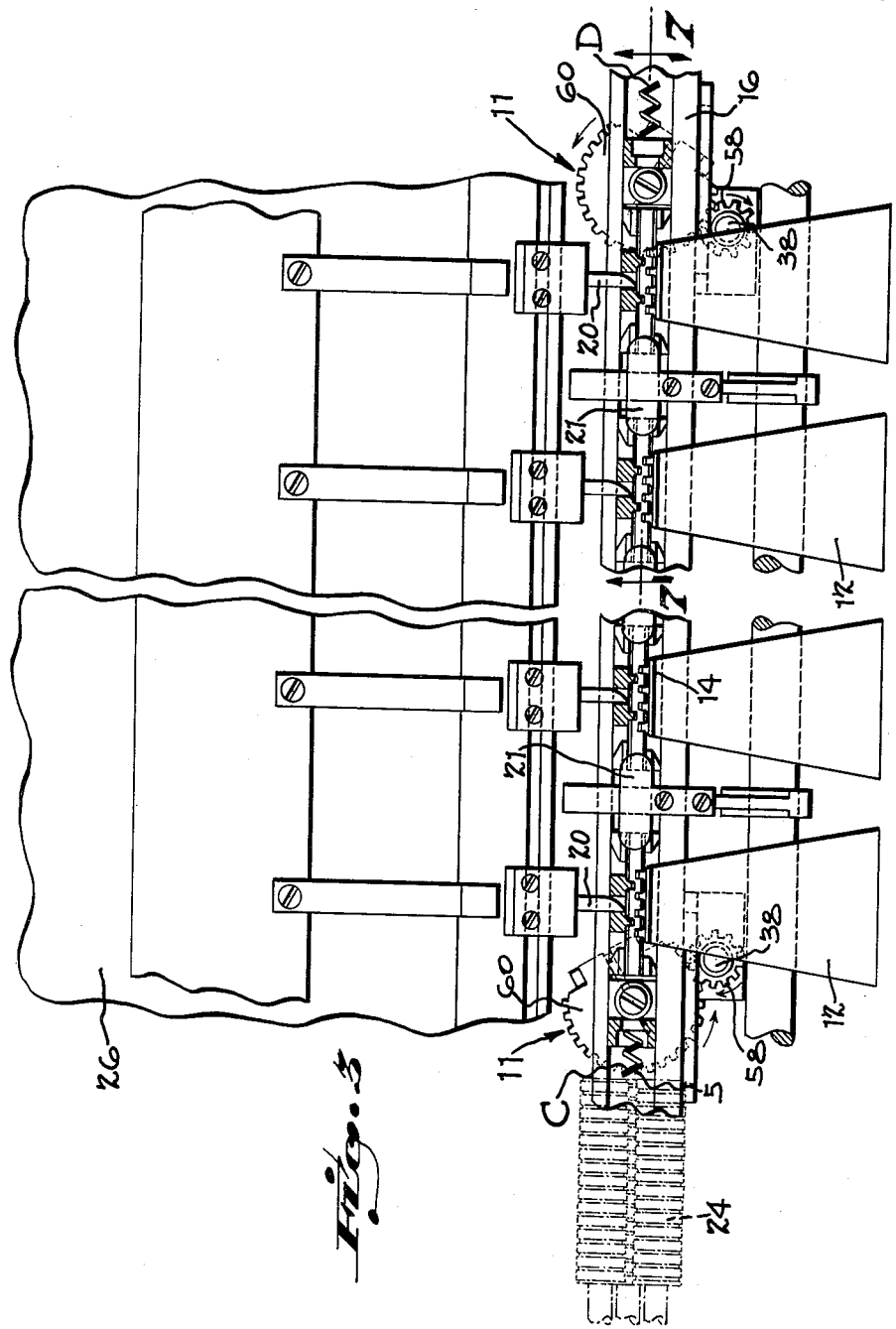

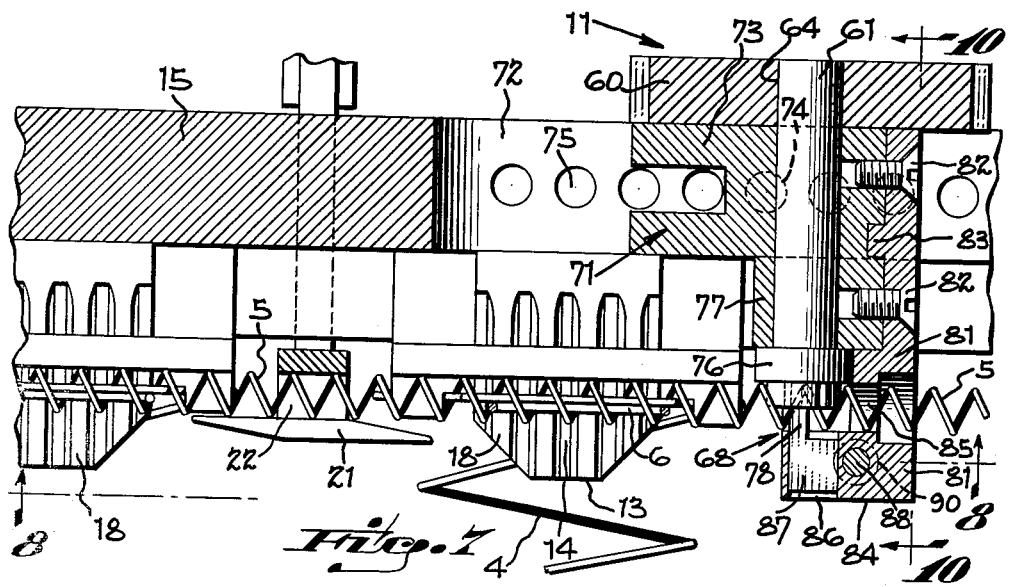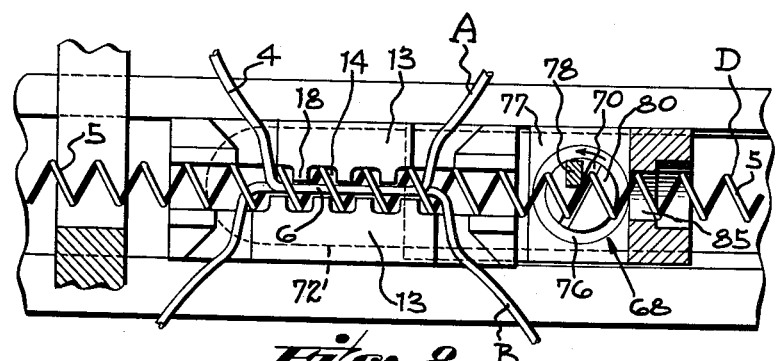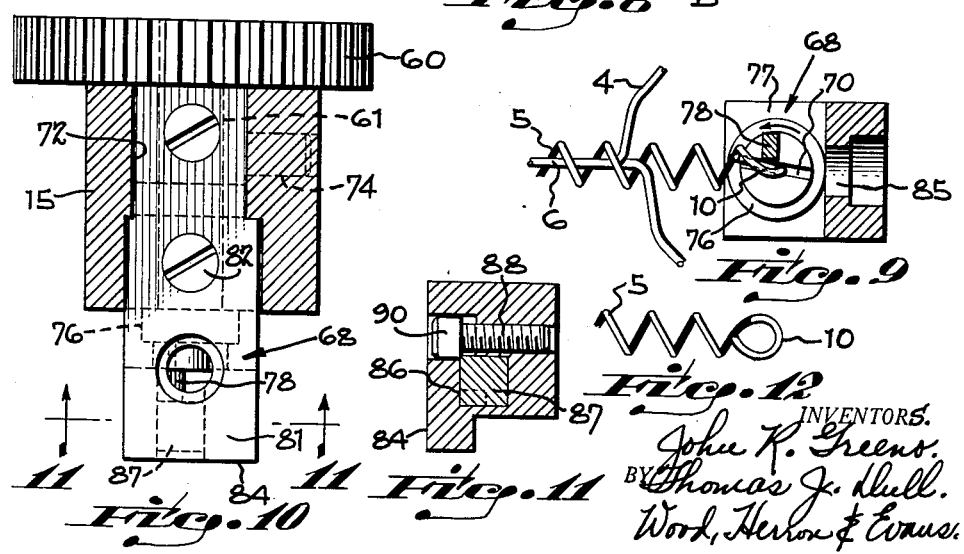

United States Patent Office 3,090,407
Patented May 21, 1963

3,090,407
HELICAL WIRE TRIMMING AND FORMING MECHANISM
John R. Greeno, 219 Hill Top Lane, Wyoming, Ohio, and Thomas J. Dull, 1293 Prospect Place, Cincinnati, Ohio
Filed Mar. 14, 1960, Ser. No. 14,749
3 Claims. (Cl. 140—92.7)

This invention relates generally to machines for assembling coil spring sections of the type used in mattresses and the like, consisting of rows of coil springs joined together at top and bottom by helical wires. In assembling such spring sections, the loose, individual coil springs are positioned in adjoining rows then the helicals are rotated and advanced in corkscrew fashion upon mating portions of the terminal coils at top and bottom, thus hingedly joining the coil springs together.

One of the primary objectives of the present invention has been to provide a power-operated mechanism for trimming the opposite ends of the helicals after they have been laced on the spring unit, and also for bending the trimmed ends to a form which locks the helicals in place with respect to the assembled row of coil springs.

The trimming and forming mechanism of the present invention is intended primarily for use in conjunction with the automatic spring assembly machine disclosed in the co-pending application, Serial No. 826,666, now Patent No. 3,045,714, of John R. Greeno and Thomas J. Dull, the present applicants. In general, the machine of the co-pending application comprises upper and lower spring guides mounted for reciprocation toward and from one another through the operation of power cylinders under push button control. At the start of the operation with the guides in loading position, the operator inserts individual coil springs in row formation into the spring guides, where the individual coils reside in mating relationship with portions of a previously assembled row of coil springs. The guide elements are then shifted to a locking position and held there while helical wires are rotated and caused to advance in corkscrew fashion upon the mating portions of the coil springs at top and bottom to connect the adjoining rows of springs.

The helical wires are pre-cut and are inserted by the operator into power-driven feeders arranged to rotate and thread the helicals at a fairly high rate of speed upon the mating portions of the coil springs at top and bottom. The length of the pre-cut helicals is somewhat greater than the width of the spring section and the helicals simply advance until their trailing ends pass beyond the feeders, at which point the helicals stop with opposite end portions projecting outwardly beyond opposite ends of the spring assembly. The helicals are held in place at this stage only by frictional engagement with the mating portions of the coils upon which they are threaded; therefore, they are apt to unscrew when the spring assembly is in service unless they are locked positively against displacement.

In the past, it has been the practice to trim off the end portions of the helicals and to lock them in place by hand through a bending operation with a suitable tool, such as a pliers. However, the hand trimming and forming technique involves the loss of considerable time in the assembly operation, since each spring section is held together by relatively large number of helical wires.

Accordingly, another objective of the invention has been to provide a mechanism for rapidly trimming and forming both ends of the upper and lower helicals concurrently and with little or no interference with the operating cycles of the spring assembly machine, utilizing individual power-operated trimming mechanisms mounted on the assembly machine and arranged to operate in unison.

A further objective of the invention has been to provide a simple trimmer head adapted to be mounted in the path of the advancing helicals, the trimmer head being arranged to rotate through a partial turn and to shear off the end portion of the helicals, and at the same time to twist the severed portion to the form of a closed loop.

The closed loop thus formed has a diameter approximately equal to the diameter of the helical and provides a positive stop which prevents unscrewing of the helicals, since the loop cannot pass around the mating portions of the springs upon which the helical is threaded. Moreover, by virtue of the loop formation, the sharp end of the severed helical is turned inwardly to an inaccessible position with only the smooth surface of the loop exposed along the sides of the spring assembly.

In general, the trimming and forming mechanism comprises individual power-operated units, mounted for movement relative to the guide elements of the assembly machine in a position to act upon both ends of the upper and lower helicals concurrently. Each unit is powered by an individual cylinder, preferably air-operated, each cylinder actuating a rack and gear driving system which imparts rotary motion to the trimmer head. The several cylinders are connected with supply and exhaust conduits, whereby air pressure is transmitted in appropriate directions through an electrically operated control valve to rotate the heads in forward and reverse directions. The control valve, in turn, is operated in response to the main control system of the spring assembly machine so as to operate the several trimming devices in time with the operating cycles of the machine.

Each trimmer head is provided with a slot extending across its diameter and the slot normally resides in the path of advancement of the helical and disposed at an angle corresponding to the lead of the helical, such that the advancing helical naturally threads its way through the slot as it advances across the coil springs. The slot has a depth approximately one-half the diameter of the helical, such that approximately half of one helical convolution fits into the slot. After the helical is threaded upon the row of coil springs, with the partial convolutions residing in the slots of the trimmer heads and the endwise portions projecting outwardly beyond the slots, the power cylinders energized, causing the trimmer heads to rotate through a partial turn from the normal position toward a cutting and forming position. In order to sever the helical, there is provided a fixed shear finger having a cutting end in sliding contact with the flat outer end of the trimmer head in a position to intercept the slot. During rotary motion of the head, the partial convolution which is confined in the slot, is twisted toward the shear finger and its projecting endwise portion is sheared between the edge of the shear finger and slot, then continued rotary motion of the head in the same direction twists the partial convolution in a rearward direction toward an adjacent convolution, causing it to combine with the adjacent half convolution to form the closed circular loop. After formation of the loop, the spring guides and trimming mechanisms are shifted to a retracted position, allowing the assembled row of springs and trimmed helicals to be indexed for the next cycle of operation.

The various features and advantages of the invention will be more clearly apparent to those skilled in the art from the following detailed description taken in conjunction with the drawings.

In the drawings:

FIGURE 1 is a general front elevation of a spring assembly machine equipped with the automatic trimming and forming mechanism of this invention.

FIGURE 2 is an enlarged fragmentary front view taken from FIGURE 1, further detailing the trimming mechanism at the right end of the machine.

FIGURE 3 is an enlarged fragmentary top plan view, partially in cross section, illustrating the trimming mechanism at opposite ends of the assembly machine.

FIGURE 4 is a top plan, as viewed along line 4—4 of FIGURE 2, detailing the power cylinder and driving mechanism of the trimming mechanism.

FIGURE 5 is a sectional view taken along line 5—5 of FIGURE 4, further detailing the driving mechanism.

FIGURE 6 is an enlarged sectional view taken along line 6—6 of FIGURE 5, detailing the reduction gears of the driving system.

FIGURE 7 is an enlarged sectional view taken along line 7—7 of FIGURE 3, detailing the trimming mechanism and its relationship with the components of the assembling machine.

FIGURE 8 is a sectional view taken along line 8—8 of FIGURE 7, showing the rotary trimmer head in position to receive the helical wire as the wire is threaded upon the mating terminal coils of a spring unit during assembly thereof.

FIGURE 9 is a view showing the rotary trimmer head rotated to its cut-off position, with the helical wire trimmed and its end bent to loop formation.

FIGURE 10 is a sectional view taken along line 10—10 of FIGURE 7, illustrating the holder for the rotary trimmer head and shear finger.

FIGURE 11 is a sectional view taken along line 11—11 of FIGURE 10, further detailing the holder.

FIGURE 12 is a view of the helical wire as projected from FIGURE 9, further illustrating the loop which is formed at its end portion as an incident of the trimming operation.

General Arrangement

Referring to FIGURE 1, the automatic trimming mechanism of this invention is shown in conjunction with the machine disclosed in the aforesaid co-pending application of John R. Greeno and Thomas J. Dull, Serial No. 826,666. In general, the spring assembly machine comprises a mounting frame 1 for the components of the assembly machine, the frame being supported upon legs 2 at an elevation which is convenient to the operator. The forward portion of the machine comprises a spring-receiving section, indicated generally at 3, into which the individual coil springs are inserted by the operator. The spring-receiving section includes suitable guide elements which confine the upper and lower terminal coils 4 (FIGURES 7 and 8) in mating relationship to receive the upper and lower helical wires 5 as they are rotated and threaded upon the offset portions 6—6 of the terminal coils.

As shown in FIGURE 1, the helical wires 5 are rotated and advanced by upper and lower helical feeders indicated at 7 and 8, which are located at the left side of the machine. The helical wires are furnished in lengths somewhat greater than the lengths of the spring section being assembled, such that an endwise portion of the helical wires projects outwardly beyond opposite ends of the spring section after the helicals are threaded in place. These projecting endwise portions are trimmed off and bent to loop formation as indicated at 10 in FIGURE 12 by the trimming mechanism of the present invention, so as to lock the helical wires permanently in assembled relationship with the coil springs.

The helical trimming and forming mechanism comprises individual units, as indicated generally at 11 in FIGURE 1, the units arranged one above the other at opposite ends of the machine to trim and form both ends of the upper and lower helical wires in a single operation. The spring assembly machine is power-operated and includes a control system which provides manual or automatically controlled cycles of operation. The individual trimming mechanisms 11 are also power-operated and are interconnected with the control system of the main machine to trim and form the helicals in time with the cycles of the main machines, as explained later.

Spring Assembling Machine

Since the trimming and forming mechanism 11 of the present invention coacts with the machine of the co-pending application, a brief description of the spring assembly machine is presented herewith for an understanding of the trimming operation. As best shown in FIGURE 2, the spring-receiving section 3 includes respective pairs of inclined skid plates 12 which form inwardly converging throats leading to the upper and lower pairs of positioning blocks 13—13, the skid plates and blocks being mounted in pairs one above the other for relative reciprocation. The coacting skid plates and positioning blocks are also termed "spring guides" in this specification. In operating the machine, the spring guides are shifted to an intermediate loading position to receive the individual coil springs. After loading, the upper and lower spring guides are shifted toward one another to a locking position, at which time the helicals are threaded in place on the coil springs by the feeders 7 and 8. After this operation, the upper and lower spring guides are shifted outwardly to a retracted position while the helical wires and joined portions of the terminal coils are confined in stationary strippers. An indexing mechanism then shifts the spring assembly rearwardly for the next cycle of operation.

The spring guides are shown in the intermediate or loading position in FIGURES 1 and 2 for insertion of the individual coil springs by the operator. When fully inserted between the skid plates, the offset portions 6 of the springs snap into open throats 14 (FIGURE 8) which are delineated by the respective pairs of positioning blocks 13—13. When the spring guides are shifted toward one another to the locking position, as shown in FIGURE 7, the coil springs are slightly compressed and the mating offset portions are locked in place by locking fingers, as explained later, to receive the helical wires. The retracted position of the spring guides has not been illustrated because this operation is not essential to an understanding of the trimming and forming mechanism.

The throats 14, which are delineated by the positioning blocks, are located at the inner edges of the upper and lower skid plates 12 and are duplicated for the upper and lower skid plates. The skid plates and positioning blocks are supported upon upper and lower mounting bars 15 and 16 which are shifted by power cylinders to the loading position, locking position and retracted position during the cycle of operation.

It is to be noted at this point that the helical trimming and forming mechanisms 11 are also mounted on the upper and lower mounting bars 15 and 16 for vertical motion with the upper and lower spring guides. The mounting bars 15 and 16 are shifted to their several positions by a group of air cylinders indicated generally at 17 in FIGURE 1, the operation of which is regulated by the control system.

After the individual coil springs are inserted in the throats of the positioning blocks 13 (FIGURE 8), the offsets 6 of the newly inserted springs, as indicated at A, reside in mating relationship with the offsets of a previously assembled row of springs, as indicated at B. In order to guide the advancing helical upon the mating offsets 6, the opposed faces of the positioning blocks are provided with vertical serrations or teeth 18 (FIGURE 7) which are staggered relative to one another to engage the helical wire and create a threading action therewith; the spacing of the teeth being equal to the lead of the helical wire 5.

When the upper and lower mounting bars 15 and 16 are shifted toward one another to the locking position (FIGURE 7) respective locking fingers, as indicated at 20 (FIGURES 2 and 3) shift into engagement with the offsets 6 of the springs to hold them in mating relationship within the throats 14 for application of the helical wires 5. At this time, the positioning blocks 13 for the upper and lower helicals reside in alignment with the sets of stationary strippers 21 (FIGURE 7) consisting of spaced fingers interposed between the sets of positioning blocks and delineating a passageway 22 for the helical wire. The strippers are mounted in a stationary position between the blocks 13 so as to confine the helical wires and coil springs when the positioning blocks are retracted; this allows the assembled spring section to be indexed rearwardly.

In applying the helical wires 5 (with the positioning blocks and skid plates shifted to the locking position of FIGURE 7) the operator manually places the end of the upper and lower helical wires into the respective funnel-shaped receivers 23 (FIGURE 1) of feeders 7 and 8 to be engaged by the sets of rotating rollers 24 which are moved into frictional engagement with the helical at top and bottom by operation of a hand lever 25. The rollers, which are motor driven, advance the helicals rapidly from spring to spring; the helicals automatically stop as their trailing ends pass beyond the sets of rollers 24. At this point, the opposite end portions of the coil springs will project beyond the spring assembly at opposite ends, as indicated at C and D in FIGURE 3.

The trimming mechanisms 11 are arranged to trim the endwise portions C and D at top and bottom and to form the loop 10 in a single operation. After the helical wires 5 have been trimmed, the mounting bars 15 and 16 are shifted outwardly to the retracted position in which the positioning blocks are shifted beyond the upper and lower strippers 21, leaving the trimmed and formed helicals at top and bottom confined within the passageways of the strippers for indexing. Upon being retracted, the positioning blocks 13 are completely disengaged from the helicals and coil springs. Upon being indexed, the assembled spring section rests upon a table surface 26 (FIGURE 3) which extends rearwardly from the spring receiving section 3. As the spring section is indexed, the newly assembled row of coil springs A is drawn rearwardly through the skid plates to a position where the terminal coils are aligned with the throats 14 of the positioning blocks for the next cycle of operation.

*Wire Trimming and Forming Mechanism*

As noted earlier, the upper and lower helical trimming and forming mechanisms 11 of this invention, are attached to the opposite end portions of the upper and lower mounting bars 15 and 16 for reciprocation with the spring guide elements during the operating cycle of the spring assembling machine. The trimmer units 11 are duplicates of one another except for the right and left hand relationship of parts at opposite ends of the machine.

As best shown in FIGURES 1 and 2, each trimming unit 11 includes a base plate 27 extending parallel with the mounting bars 15 and 16 at opposite end portions thereof, each base plate being connected to its mounting bar by a pair of mounting brackets indicated at 28 and 30. These mounting brackets have their inner ends attached by screws 31 (FIGURE 2) to the mounting bars 15 or 16, the mounting brackets being arranged to support the trimming units rigidly with respect to the respective mounting bars 15 and 16. The inner ends of the brackets 28 and 30, which are attached to the mounting bars, preferably are slotted as at 32 to permit the brackets to be adjusted with respect to the screws 31.

Each bracket 28 is generally L-shaped as viewed from the side, providing a foot 33 overlying the base plate 27 and secured thereto by screws 34. As viewed from above, as in FIGURE 4, the base plate 27 is disposed at an angle to the mounting bar 15 and its forward edge 35 is parallel with the mounting bar 15. The companion bracket 30 projects upwardly above base plate 27 and is slotted as at 36 (FIGURE 5) intermediate its length to interfit the edge of base plate 27. The base plate may be secured to the bracket 30 by welding or other means along slot 36. The bracket 30 further includes a bearing block 37 attached by screws or other means, the block 37 having a bore which journals one of the actuating shafts 38 of the gear train indicated generally at 39 (FIGURE 5) which actuates the trimming mechanism, as explained later. The gear train is powered by an air cylinder, indicated generally at 40, which includes a rack indicated generally at 41 in driving connection with the gear train 38.

Described in detail (FIGURES 2 and 4) the cylinder 40 is of conventional design and includes a piston (not shown) having a piston rod 42 connected as at 43 to the rack 41. The cylinder is mounted upon the base plate 27 by a pair of L-shaped brackets 44 secured to the opposite ends of the cylinder, the foot of each bracket being attached by screws 45 to base plate 27. Air pressure is supplied and exhausted with respect to the opposite ends of the cylinder by way of the conduits 46 and 47 to cause reciprocation of the piston rod and rack.

As best shown in FIGURES 4–7, rack 41 meshes with a pinion 48 which is pinned as at 50 (FIGURE 5) to the shaft 38 which is journalled in the bearing block 37 as previously explained. In order to hold the rack teeth properly in mesh with pinion 48, there is provided a small L-shaped bracket 51 attached by screws 52 to the mounting plate 27. This bracket journals a backing roller 54 carried on a stub shaft 55 and tracking upon the rearward surface of the rack to hold its teeth in meshing engagement with pinion 48. A second roller 56, journalled on the second stub shaft 57 of the bracket (FIGURE 5), tracks upon the top surface of the rack to confine it downwardly with respect to the pinion.

At the lower end of shaft 38 (FIGURES 5 and 6) there is provided a second pinion 58, which is pinned as at 59 to the shaft. Pinion 58 meshes with a gear 60, the gear being clamped to a rock shaft 61. Rock shaft 61 actuates the trimming and forming head, as explained below. In order to clamp gear 60 to shaft 61 (FIGURE 6) the gear teeth are interrupted and this portion is shaped to provide a pair of lugs 62—62 divided by a radial slot 63 which extends inwardly to the bore 64 in which shaft 61 is seated. Clamping pressure is exerted by a screw 65 having one portion in threaded engagement as at 66 with one of the lugs and passing loosely through the second lug. The screw has a head 67 seated against the second lug, such that rotation of the screw draws the gear under pressure with respect to the shaft 61. This arrangement permits the cutting and trimming head to be adjusted for proper operation, as explained below.

Each upper trimmer head, indicated generally at 68 (FIGURES 7 and 8) is journalled for rotary motion below the mounting bar 15 and in alignment with the spring guides. The lower trimmer heads 68 are mounted in a corresponding position (FIGURE 2) above the lower mounting bar 16. The arrangement is such that the end portion of the helical 5 naturally threads its way through the trimmer heads, which are slotted as at 70 (FIGURES 8 and 9) for this purpose.

Described in detail with reference to FIGURES 5–8, the trimmer head 68 forms the lower end of the rock shaft 61, which projects from gear 60, shaft 61 being journalled in a bracket, indicated generally at 71. In order to align the trimmer with respect to the mounting bar 15, the end portion of the mounting bar is slotted as at 72 to receive the bracket 71. The brackets of the lower trimmers are similarly mounted in slots formed in the lower mounting bar 16. The bracket 71 is in the form of a bearing block having a head portion 73 which interfits the slot 72, the head being locked longitudinally within the slot 72 by one or more set screws 74 (FIGURE 10). As viewed in FIGURE 7, the bar 15 is provided with a series of lateral threaded bores 75 opening into slot 72, and adapted to receive one or more of the set screws 74. The elongated slot, with its threaded bores 75, permits the trimming mechanism to be adjusted longitudinally with respect to the mounting bar to accommodate the size of the spring units which are to be fabricated.

As noted earlier, the mounting brackets 28 and 30 are slotted as at 32 to permit the base plate 27 and gear train components to be adjusted lengthwise with respect to the mounting bar. As shown in FIGURES 4 and 7, the base plate 27 and bracket 71 necessarily must be adjusted relative to one another within fairly close limits to properly mesh the teeth of pinion 58 and gear 60.

Referring to FIGURES 7–9, the trimmer head 68 is delineated by a collar 76 which provides a thrust bearing engagement with the lower surface of a boss 77 projecting downwardly from the bearing block 71. The collar 76 thus locates the trimmer head 68 vertically with respect to the surface of the spring guides and in the plane of advancement of the helicals 5 (FIGURE 7). As viewed in FIGURE 7, the trimmer head 68 projects downwardly beyond collar 76 a distance equal to approximately one-half the diameter of the helical. The slot 70 of the trimmer head extends from the lower surface of collar 76 to the lower end of the trimmer head to receive approximately one-half of one convolution of the helical.

As viewed in FIGURE 8, the trimmer head normally resides in a stationary position with the slot 70 disposed at an angle which corresponds to the lead of the helical 5. The diameter of the trimmer head is less than the diameter of collar 76 and is also related to the lead of the helical, such that the advancing helical naturally threads its way across the slot and about the trimmer head as shown.

In order to sever the helical, there is provided a fixed shear finger 78 having an end in slidable contact with the end surface 80 of the trimmer head 68. The edge of the shear finger 78 and edge of slot 70 thus coact to shear the helical during rotation of the trimming head from the position of FIGURE 8 to the position of FIGURE 9. It will be noted that the shearing action is carried out during the initial rotary motion of the trimmer head in the direction indicated by the arrow (FIGURES 8 and 9). As the trimmer head rotates, the half convolution, which is confined in the slot, is twisted toward the shear finger, causing the projecting endwise portion D to be sheared from the partial convolution. Thereafter, continued rotary motion of the trimmer head in the same direction twists the sheared half convolution toward an adjacent convolution, such that the sheared end is carried beyond the adjoining convolution of the helical to form the loop previously indicated at 10 in FIGURE 12. During the trimming operation, the endwise portion (D or C) of the convolution is supported relative to the trimmer head in a guide bore, as explained below.

The fixed shear finger 78 is rigidly mounted beneath the trimmer head 68 by a generally L-shaped bracket 81 (FIGURE 7) which is attached by screws 82 to the block 71, bracket 81 having a key 83 which interfits a corresponding keyway formed in the block 71 for locating purposes. The foot 84 of the L-shaped bracket 81 underhangs the end surface 80 of the trimmer head 68 and includes the guide bore 85 adjacent the trimmer head to provide a support for the end portions C or D of the helical during the trimming operation. The foot 84 further includes a square socket 86 (FIGURE 11) and the shear finger projects upwardly from a square mounting block 87 which interfits the socket 86. The mounting block 87 is clamped in the socket 86 by a screw 88 (FIGURE 11) threaded into the foot 84 and having a head 90 in clamping engagement with the corner portion of the mounting block 87.

The shear finger 78 and its mounting block comprises a one-piece unit fabricated from a suitable grade of hardened steel and may be conveniently demounted from the foot to be sharpened or adjusted by loosening the clamping screw 88. The trimmer head 68 similarly is fabricated from a suitably hard grade of steel to provide the shearing action without excessive wear along the shearing edge of slot 70.

During the trimming and forming stroke, air pressure is admitted to the cylinder by way of conduit 47 (FIGURE 4), causing the piston rod and rack to rotate pinion 48 in the direction indicated. The rotary motion of pinion 48 is transmitted through shaft 38 to the lower pinion 58, thus rotating gear 60 in the direction indicated by the arrow in FIGURE 6, as viewed from above. This motion rotates the trimmer head 68 in the direction indicated by the arrows in FIGURES 8 and 9, as viewed from below. The pinion 58 and gear 60 create a reduction in the drive suitable for the shearing and bending resistance which is generated during the trimming and forming operation. After the end portion of the helical is sheared off, the sheared end may drop from the bore 85 or it may be dislodged when the next helical is threaded in place.

After the loop 10 is formed, the mounting bars 15 and 16 are shifted outwardly to their retracted position, thus disengaging the slot 70 of the trimmer head from the loop 10. After the retracting stroke, air pressure is admitted to the conduit 46 so as to shift the trimmer head 68 back to its normal position (FIGURE 8) for the next cycle of operation. It will be understood that the air cylinder provides a fixed stroke which, through the gear train, shifts the slot 70 through its range of operation, as shown in FIGURES 8 and 9. As noted earlier, the angular disposition of the slot in its operating range is determined by the rotary adjustment of gear 60 with respect to the trimmer shaft 61.

*Control System*

As noted earlier, the operation of the trimming units preferably is regulated by the electrical control system of the spring assembly machine which is disclosed in the co-pending application. For this purpose, there is provided a solenoid valve, as indicated diagrammatically at 91 in FIGURE 4 which supplies air pressure to the four cylinders 40 of the trimming units, the solenoid valve being electrically interconnected with the main control circuit.

The solenoid valve 91 is provided with windings 92 and 93 and includes a pressure conduit 94 and a pair of manifold conduits 95 and 96, which lead to the conduits 46 and 47 of each cylinder throughout the machine. The solenoid valve 91 is provided with a shiftable core and internal ports (not shown) to supply air pressure alternately to one of the manifolds while exhausting the air pressure from the other manifold in response to selective energization of the solenoid windings 92 or 93. For example, if winding 93 is energized, air pressure is supplied to manifold conduit 96 and conduit 47, causing the piston rod and rack to be retracted, as indicated in FIGURE 4, while air pressure is exhausted from the cylinder by way of conduit 46 and manifold 95 through valve 91 to the atmosphere. The windings 92 and 93 are interconnected with a common power line 97, the circuit being completed to the selected winding by way of the lines 98 and 100. These lines are interconnected with the control circuit of the spring assembling machine.

In order to provide an interlock between the main machine and trimming units, each trimming unit is provided with a limit switch 101 (FIGURE 4) which is also interconnected with the main control circuit. In the present example, the limit switches may be of the normally open type which are maintained in closed position by a finger 102 carried by the piston rod 42 of each cylinder. The arrangement is such that the limit switches are closed when the slot 70 of each trimmer head is in its normal position (FIGURE 8) in alignment with the convolutions of the helical. The several limit switches 101 are connected in series with one another, such that the slots 70 of all the trimmer heads must be normally aligned before a circuit can be completed to initiate a cycle of operation of the main assembly machine.

According to the co-pending application, the spring guides reside in their loading position at the end of a cycle ready to receive a new row of individual coil springs. After the coil springs are inserted, the operator depresses a push button switch which, through operation of the cylinders 17, causes the spring guides to be shifted toward the locking position (FIGURE 7) so that the upper and lower helicals may be woven in place. The limit switches 101 are serially interposed in the circuit which includes the starting switch; therefore, if any one of the trimmer head slots 70 are not in the normal position (FIGURE 8) in line with the helical, the guides will not shift to locking position, thus warning the operator not to feed in the helicals until the trouble is cleared up.

After the helicals are woven in place, as outlined earlier, the circuit is conditioned to retract the spring guides and to index the spring section rearwardly. However, the end convolutions of the helicals have now been threaded through the slots 70 of the trimmer heads; therefore, the trimming and forming operation must be carried out before the spring guides are retracted. Accordingly, the circuit is arranged to energize line 100 and winding 93 so as to rotate the trimmer heads (FIGURES 8 and 9) for the trimming and forming operation, as explained above. The trimmer heads remain in the trimming position of FIGURE 9 until after the spring guides are retracted, then the circuit energizes line 98 and winding 92, causing the trimmer heads to be shifted back to the normal position of FIGURE 8 ready to receive the helicals during the next cycle.

Having described our invention, we claim:

1. A helical trimming and forming mechanism for a spring assembly machine, said assembly machine adapted to rotate and thread a helical wire about mating portions of coil springs in row formation thereby to join the springs together, said wire trimming and forming mechanism comprising, a base adapted to be attached to the spring assembly machine, a trimmer head mounted in a substantially fixed plane for rotation relative to said base in the path of advancement of the helical wire, said trimmer head having a flat outer end surface disposed at right angles to the axis of rotation of the trimmer head, said trimmer head having an open slot formed therein, said trimmer head normally residing in a receiving position with said slot disposed at an angle corresponding to the lead of the helical wire, said slot extending inwardly from said flat outer end surface and having a depth equal to substantially one-half the diameter of a convolution of the helical wire, adapting the slot to receive and confine a partial convolution of the helical wire with an endwise portion thereof projecting beyond said slot after the same is threaded in place, a stationary shearing element, said base having a socket adapted to receive an end portion of said shearing element, releasable clamping means connected to the base and adapted to secure said portion of the shearing element in said socket with an opposite end portion of the shearing element slidably contacting the flat outer end surface of the trimmer head in a position to shear the endwise portion of the helical wire which projects beyond the slot, said releasable clamping means adapting the shearing element to be adjusted relative to said flat outer end surface of the trimmer head, means for rotating said trimmer head from said receiving position toward a forming position with said partial convolution confined in said slot, said shearing element adapted to coact with said slot to sever the projecting endwise portion from the helical wire during rotation of the trimmer head toward said forming position, said trimmer head adapted to bend the partial convolution, which is confined in said slot, in a reverse direction to form a closed loop during continued rotation in the same direction toward the forming position after the projecting end portion has been severed therefrom, said closed loop adapted to lock the helical wire relative to the row of coil springs.

2. A helical trimming and forming mechanism for a spring assembly machine, said assembly machine having helical wire guide means and adapted to rotate and thread the helical wire about mating portions of coil springs in row formation, thereby to join the springs together, said wire trimming and forming mechanism comprising, a base adapted to be attached to the spring assembly machine, a cylindrical trimmer head mounted for rotation relative to said base in the path of advancement of the helical wire, said trimmer head having a flat outer end disposed generally at right angles to the axis of rotation thereof, said outer end residing substantially at the central axis of the helical wire guide means, said outer end having an open slot formed therein, said open slot extending inwardly from the flat outer end of the trimmer head, said trimmer head normally residing in a receiving position with said slot disposed at an angle corresponding to the lead of the helical wire, said slot having a depth equal to substantially one-half of the diameter of a convolution of the helical wire and thereby adapted to receive and confine a partial convolution of the helical wire with an endwise portion of the helical wire projecting beyond said slot after the same is threaded in place, a stationary shearing element, said base having a foot portion which extends transversely in spaced relationship to the flat outer end of the trimmer head, said foot portion having a socket formed therein adapted to receive an end portion of the shearing element, releasable clamping means connected to the base and adapted to secure the end portion of the shearing element in said socket with the shearing element projecting toward the flat outer end of the trimmer head, said shearing element having a shearing end slidably engaging the flat outer end of the trimmer head adjacent said slot in a position to shear the endwise portion of the helical wire which projects beyond the slot, and means for rotating said trimmer head from said receiving position toward a forming position with said partial convolution confined in said said slot, said shearing end adapted to coact with said slot to sever the projecting endwise portion from the helical wire during rotation of the trimmer head toward said forming position, leaving the partial convolution confined in said slot, said trimmer head adapted to bend the partial convolution toward an adjacent convolution and thereby to form a closed loop during continued rotation in the same direction toward the forming position after the projecting end portion has been severed therefrom.

3. A helical trimming and forming mechanism for a spring assembly machine, said machine having guide means and being adapted to rotate and thread a helical wire about mating portions of coil springs in row formation, said trimming and forming apparatus comprising, a base adapted to be attached to the spring assembly machine, a rock shaft journalled relative to said base, a trimmer head mounted on the end of said rock shaft, said trimmer head having a flat outer end surface disposed at right angles to the axis of rotation of the trimmer head, said flat outer end surface disposed substantially at the central axis of said guide means and at right angles to the axis of said rock shaft, power means connected to said rock shaft for rotating the trimmer head, said outer end surface of the trimmer head having a slot formed therein, said slot extending inwardly from said flat outer end surface and having a depth equal to substantially one-half the diameter of the helical wire, said slot adapted to receive and confine substantially one-half of a convolution of the helical wire which is advanced through the guide means, with the end portion of the helical wire projecting beyond said slot, said trimmer head normally residing in a stationary position adapting the helical wire to be threaded through said slot, said base having a portion projecting outwardly beyond the trimmer head and including a bore extending transversely to the axis of rotation of the trimmer head and communicating with the trimmer head, said bore adapted to reside in axial alignment with said guide means in a position to receive the end portion of a helical wire after the same has been threaded about the mating portions of the coil springs and through the slot of the trimmer head, said bore having a diameter adapted to confine the end portion of the helical wire which projects beyond the trimmer head, a shearing element mounted on the projecting portion of the base, said shearing element having an end in sliding contact with the flat outer end surface of the trimmer head, the end of the shearing element being displaced outwardly from the axis of rotation of the trimmer head, said power means adapted to rotate said shaft and trimmer head from said normal position toward a forming position with said partial convolution confined in said slot and with the end portion of the helical wire confined in said bore, whereby the edge of said slot intercepts said shearing element and severs the projecting end from the partial convolution, said power means rotating said trimmer head beyond said position with the partial convolution confined in said slot, whereby said convolution is bent toward and adjacent partial convolution to create a loop formation at the end of the said helical wire during continued rotation of the trimmer head in the same direction after the shearing operation.

References Cited in the file of this patent

UNITED STATES PATENTS

| | | |
|---|---|---|
| 1,930,715 | Heuer | Oct. 17, 1933 |
| 2,161,689 | Strandberg | June 6, 1939 |
| 2,808,079 | Tauber | Oct. 1, 1957 |
| 2,902,060 | Sprang | Sept. 1, 1959 |
| 2,995,157 | Catini | Aug. 8, 1961 |